Feb. 10, 1942.  A. H. DICKINSON  2,272,366
CONTROL ELEMENT FOR STATISTICAL MACHINES
Filed July 25, 1939  6 Sheets-Sheet 1
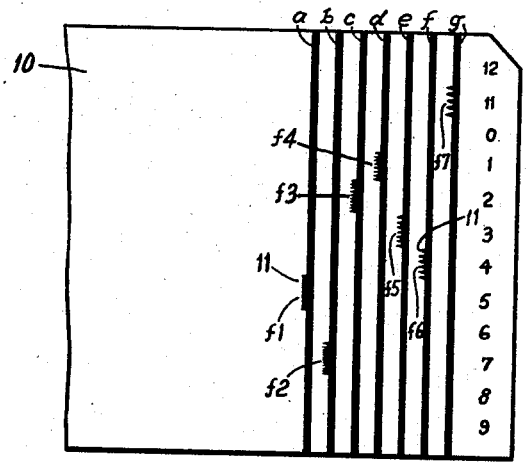
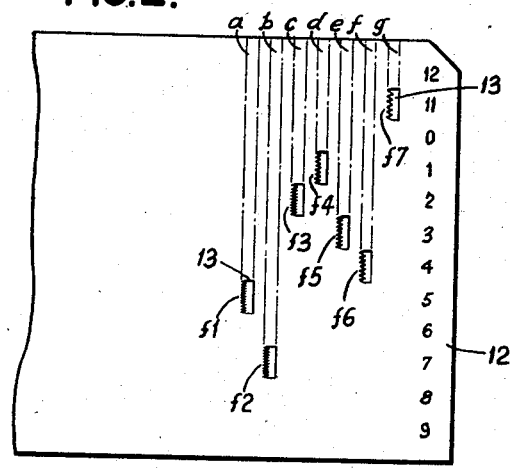
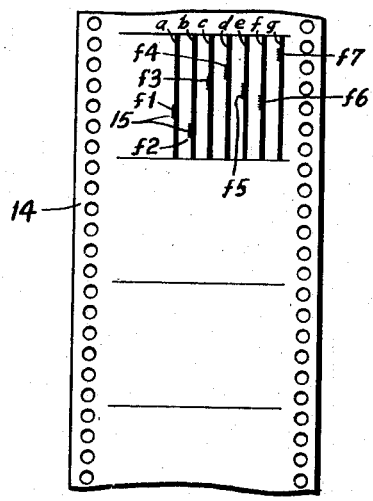
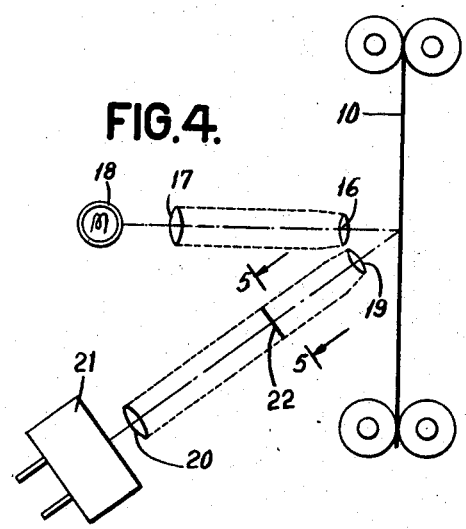
INVENTOR
Arthur H. Dickinson
BY
W. M. Watson
ATTORNEY Feb. 10, 1942. A. H. DICKINSON 2,272,366
CONTROL ELEMENT FOR STATISTICAL MACHINES
Filed July 25, 1939 6 Sheets-Sheet 2

INVENTOR
Arthur H. Dickinson
BY
W. M. Wilson
ATTORNEY

Feb. 10, 1942. A. H. DICKINSON 2,272,366
CONTROL ELEMENT FOR STATISTICAL MACHINES
Filed July 25, 1939 6 Sheets-Sheet 3

INVENTOR
Arthur H. Dickinson
BY
W. M. Wilson
ATTORNEY

Feb. 10, 1942. A. H. DICKINSON 2,272,366
CONTROL ELEMENT FOR STATISTICAL MACHINES
Filed July 25, 1939 6 Sheets-Sheet 4
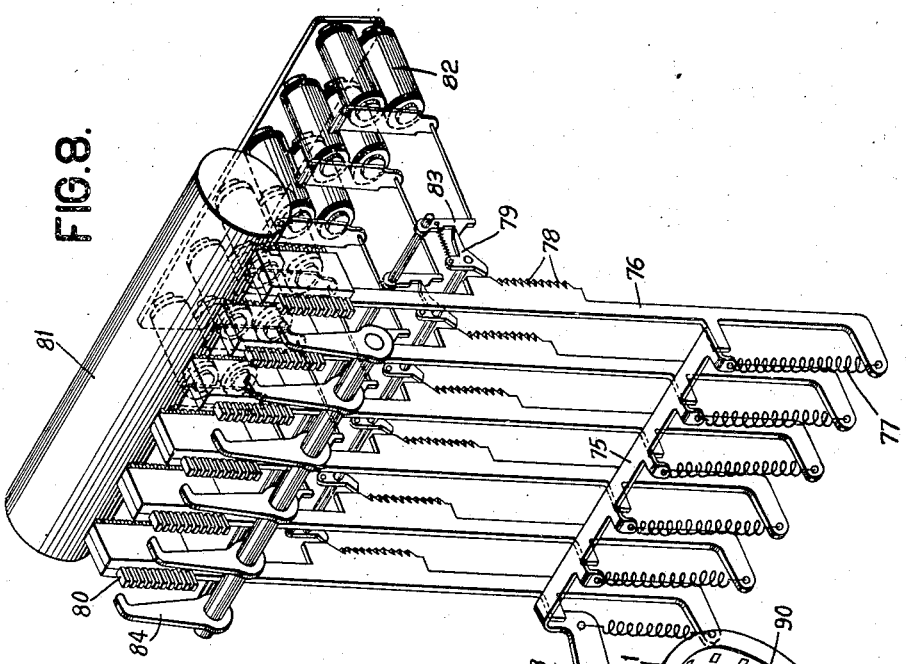
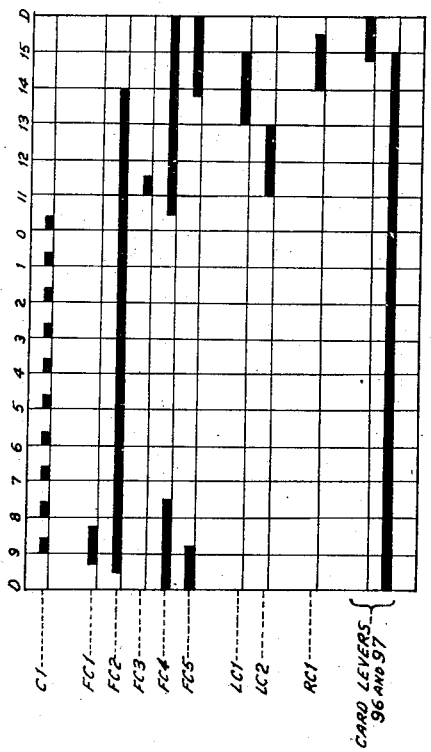
INVENTOR
Arthur H. Dickinson
BY
ATTORNEY Feb. 10, 1942.  A. H. DICKINSON  2,272,366
CONTROL ELEMENT FOR STATISTICAL MACHINES
Filed July 25, 1939  6 Sheets-Sheet 5

INVENTOR
Arthur H. Dickinson
BY
ATTORNEY

Feb. 10, 1942. A. H. DICKINSON 2,272,366
CONTROL ELEMENT FOR STATISTICAL MACHINES
Filed July 25, 1939 6 Sheets-Sheet 6

Patented Feb. 10, 1942

2,272,366

UNITED STATES PATENT OFFICE 2,272,366

CONTROL ELEMENT FOR STATISTICAL MACHINES

Arthur H. Dickinson, Scarsdale, N. Y., assignor to International Business Machines Corporation, New York, N. Y., a corporation of New York Application July 25, 1939, Serial No. 286,444

1 Claim. (Cl. 235—61.12)

This invention relates to control elements for statistical machines and more particularly to such control elements which are adapted for use in statistical and accounting systems of the Hollerith type wherein the differentially positioned index marks formed on the control elements are effective for controlling selectively the statistical and accounting operations of the machines in accordance with the values of the index marks.

Heretofore, it has been customary to employ differently positioned index marks in different columns on the record elements or mediums for controlling the operations of statistical systems and having all the index marks in the different columns formed in precisely the same manner. For example in the Hollerith system differentially positioned perforations are employed to represent the data, the size of which are all the same in the different columns on the record cards. In other suggested systems employing graphical characters on the record mediums in combination with different forms of analyzing devices the configurations of the index marks vary but solely for the purpose of identifying the value of the data representing marks.

In none of the systems suggested have index marks of different patterns or variations been used for determining the value of the representing mark by virtue of its differential position and in addition thereto by virtue of its configuration or pattern denote its columnar value or relationship with respect to the record medium. In most of the systems referred to, wherein the different columns or orders of data are sensed concurrently, columnar segregation or differentiation is obtained by the use of individual circuits or control elements, one for each column or order of data to be sensed, which in turn control the connected control means representing and controlling the individual and different orders of the data accumulating or printing sections of the machine.

It is now suggested that in the electrically controlled statistical systems, wherein different columns of data are sensed or analyzed concurrently for control purposes, a single control channel between the data sensing and data manifesting sections be employed instead of the multiple channels or conductors used at the present time. In addition thereto it is suggested to provide in the simplified and improved statistical system a novel combination of elements comprising in part data sensing means for analyzing concurrently the differentially positioned index marks on the records to initiate during the analyzing or sensing cycle differentially timed electrical impulses of different frequencies, a different frequency for each column of data sensed, which are impressed upon the common circuit or channel connecting the said data sensing and manifesting sections. In this manner columnar segregation or differentiation of the data is obtained.

It is important to note that provision is made whereby the data sensing means is controlled directly by the index marks for creating the differentially timed electrical impulses. Light sensitive devices are provided for sensing the index marks on the records, which devices vary the electrical pulses or currents in the associated circuits in response to and in accordance with varying amounts of light to which the light sensitive devices are subjected. Novel records are provided for controlling the light sensitive devices not only at differential times in the sensing cycle when the index marks thereon are sensed, but also for controlling the different light variations to which the said devices are subjected at the particular timed intervals the index marks are sensed in the cycle. The index marks of the novel records are differentially positioned thereon in different columns to represent the different values of the data represented thereby. The configurations or patterns of the index marks in each column are alike, but the patterns of the index marks in the different columns differ with respect to each other. These index marks comprise light controlling representations which are formed in different patterns having a plurality of light controlling portions arbitrarily disposed in the index mark areas for controlling the frequencies of light variations directed to the associated light sensitive devices, or stated in other words, the light controlling portions are arranged in the index mark areas for controlling the changes in the amounts of light to which the associated light sensitive devices are subjected. It is now understood that upon sensing these index marks having different light controlling properties the light sensitive devices are controlled accordingly to generate electrical oscillations differing in frequency depending upon the frequencies of light interruptions caused by the index marks. The differentially timed impulses or oscillations of different frequencies which are generated are then impressed upon the common connecting circuit for controlling the data manifesting sections. Appropriate tuned circuits are provided with the different control elements for each order of the data manifesting sections to direct the impulses of different frequencies to the proper control elements thereby controlling the statistical operations of the machine in accordance with the sensed index marks.

Accordingly, an object of the present invention resides in the provision of a control element for controlling the operations of statistical machines provided with differentially disposed data designations in the form of index marks having different configurations.

Another object of the present invention resides in the provision of a control element for controlling the operations of statistical machines provided with differentially disposed data designations, which designations have different light controlling properties so as to control the statistical operations of the machines not only by the differential positioning of the designations but also by the different formations of the designations.

Another object of the present invention resides in the provision of a record medium having differentially disposed index marks formed thereon, said index marks comprising a plurality of light controlling portions the frequency of occurrence of which vary for each index mark on the medium, said medium being adapted for controlling the statistical operations of the machines in accordance with the differential positions of the index marks and the light controlling portions of the said index marks.

Other objects of the invention will be pointed out in the following description and claim and illustrated in the accompanying drawings, which disclose, by way of example, the principle of the invention and the best mode, which has been contemplated, of applying the principle.

In the drawings:

Fig. 1 is a detail view of a fragmentary section of a novel record card.

Figs. 2 and 3 are detail views of modified forms of novel control records.

Fig. 4 is a diagrammatic view of one form of record analyzer.

Fig. 5 is a detail of a light limiting disk.

Fig. 8 is an isometric view of a data listing unit.

Fig. 9 is a timing chart for certain control elements of the machine.

Figure 10A:
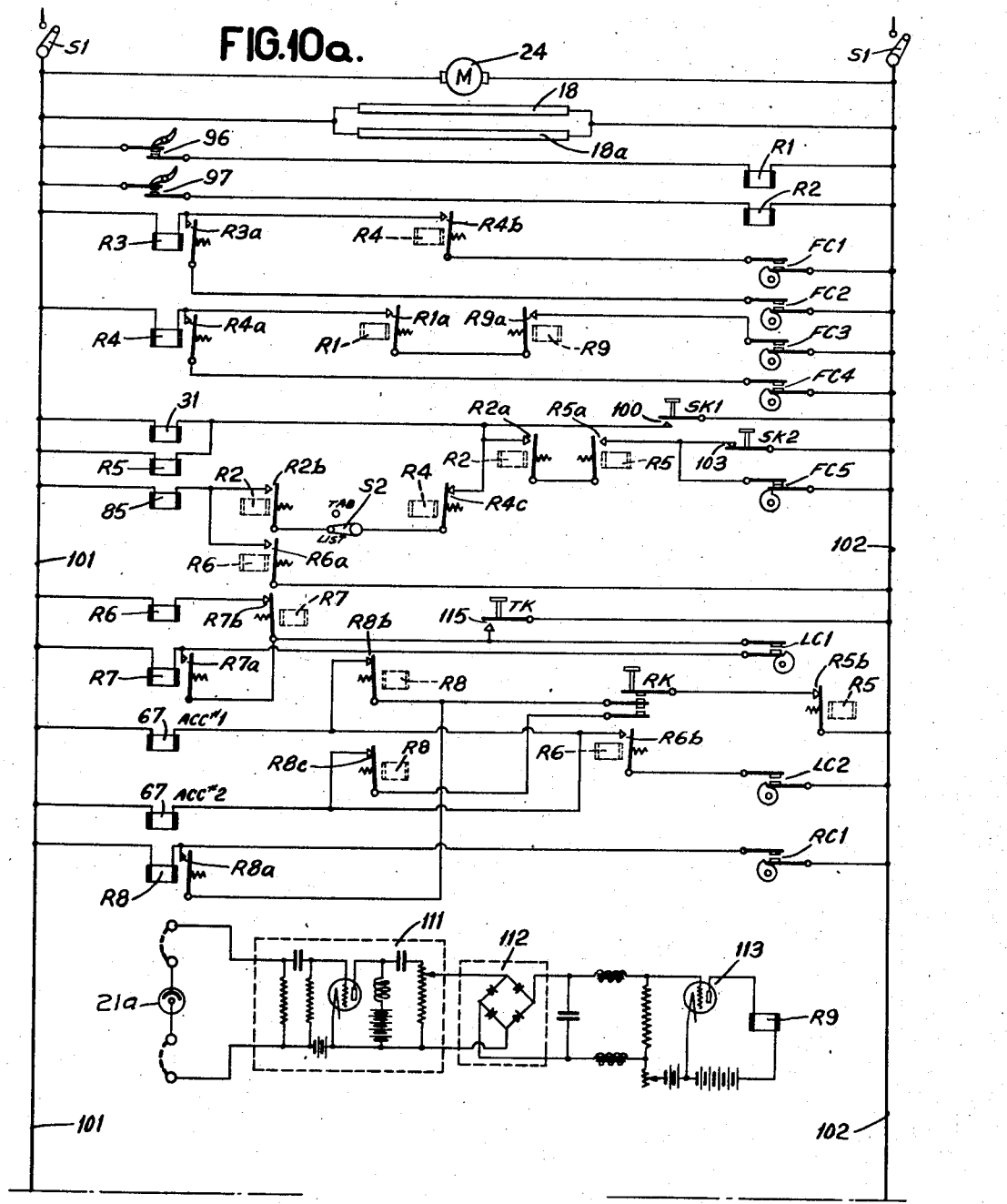
Figure 10:
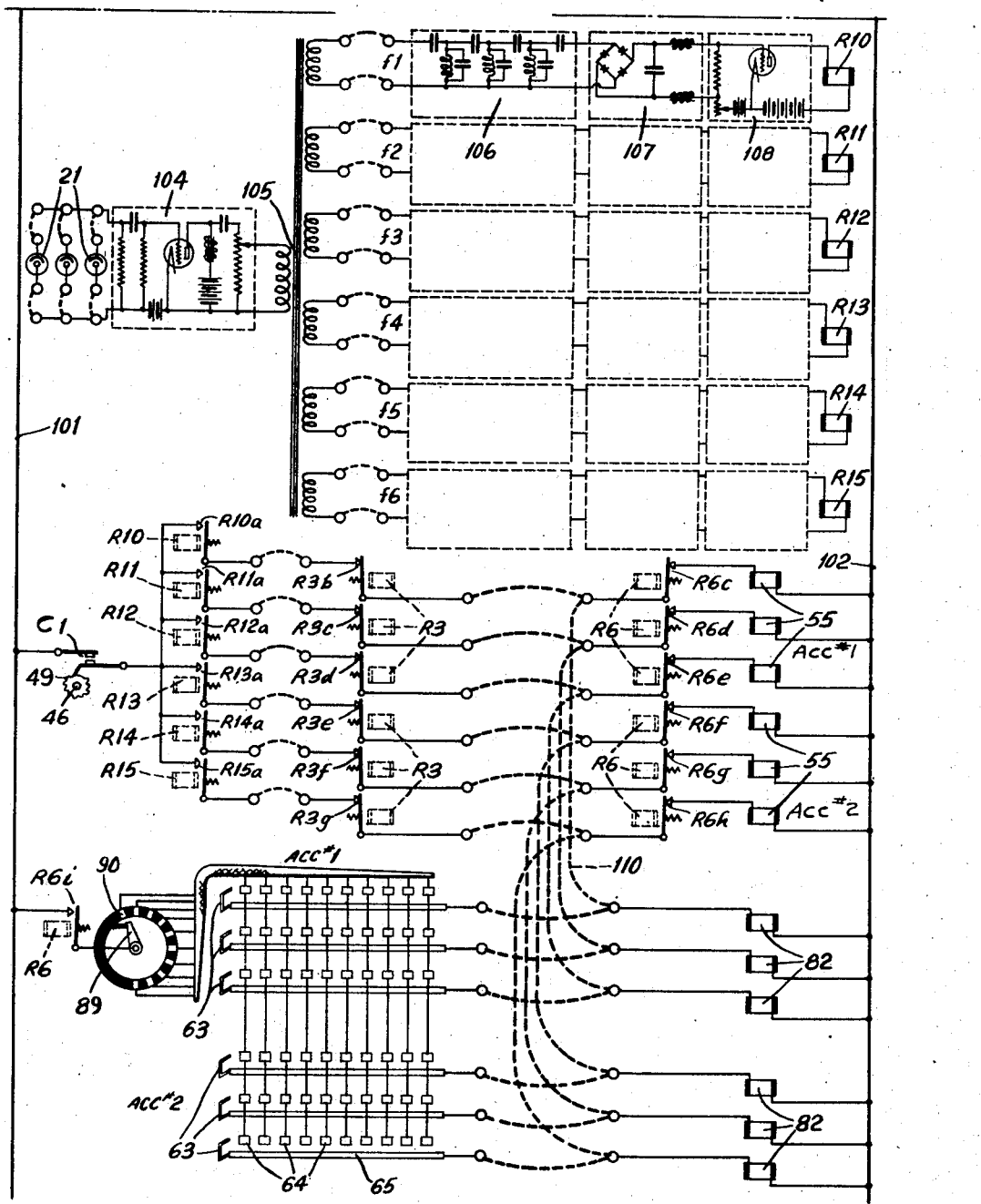

Figs. 10a and 10b taken together form a wiring diagram of the control circuits of the machine.

Control records

Referring now to Fig. 1 one of the preferred types of light controlling records adapted for use in the novel statistical machine will be described. The reference numeral 10 designates a record card similar to the type now used in the present Hollerith statistical system which is shown divided into different columns as indicated at $a$, $b$, $c$, etc. Each column is divided into twelve index point or mark positions, so that the positioning of the index marks at these different positions in the different columns denotes the different values of the data represented by the index marks. The differently positioned index marks are shown in the said figure and indicated by the reference numeral 11. It is to be noted that the configurations of the index marks in the different columns which in Fig. 1 comprise graphical wave forms or patterns are different with respect to each other. It is seen that the light and dark portions of the index mark areas are arbitrarily arranged so as to produce differently shaped wave forms or patterns. The purpose of the described arrangement is for controlling the changes in the amount of light directed to cooperating light sensing devices whenever the index marks are scanned or sensed by the rays of light. The method of analyzing or sensing the index marks will be described presently. The record card 10 is opaque, therefore reflected light is directed to the light sensitive devices whenever the card and index marks thereon are exposed to the light rays. It is well known that varying amounts of light are reflected by light and dark areas on control records which are scanned by light rays, the frequency of the light variations depending upon the arrangement of the light controlling portions or areas. It is seen that the configurations of the graphical patterns at the different index mark positions in the columns differ with respect to each other, and for illustrative purposes, assume that the configurations are so shaped so that the index mark 11 in the column designated $a$ is effective to cause $f1$ variations in the light reflected thereby, or stated in other words represents a frequency of $f1$, the index mark in column $b$ represents frequency $f2$, the index mark in column $c$ represents frequency $f3$, etc. It will be understood as the description progresses that the different frequencies represented by the different index marks will be effective for determining the columnar segregation or differentiation of the data represented by the index marks. The varying patterns of the index marks may be printed in black ink on record cards affording a white background for the marks, or if desired the light controlling records may be made photographically in accordance with well known photographic methods. The record cards can be provided with a light sensitive surface so that individual light controlling patterns or graphs can be formed thereon photographically.

Other types of light controlling records are shown in Figs. 2 and 3 which can be used in the statistical system described in the instant application. In Fig. 2, the record card 12 is provided with perforations 13 having varying configurations which are disposed in the different columns. When the perforated records are used in combination with the machine to be described the light rays are not reflected by the index marks, instead the source of light is positioned so that the light rays are directed through the perforations to the light sensitive devices. In Fig. 3, the reference character 14 designates a photographic film record provided with a plurality of control records arranged successively along the length of the film. The differentially positioned index marks 15 are shown to comprise differently shaped patterns as described hereinabove, the exception being with this particular type of light controlling record that the light controlling properties of the index marks depend upon the translucency thereof for controlling the changes in the amounts of light passed through the film record to the light sensitive devices. Whenever it is desired to employ the film record in the present statistical system instead of the record cards described, the film feeding and sensing mechanisms described in U. S. Patent No. 2,124,906 may be used in place of the mechanism now to be described.

Analyzing the light controlling records

Figure 6:
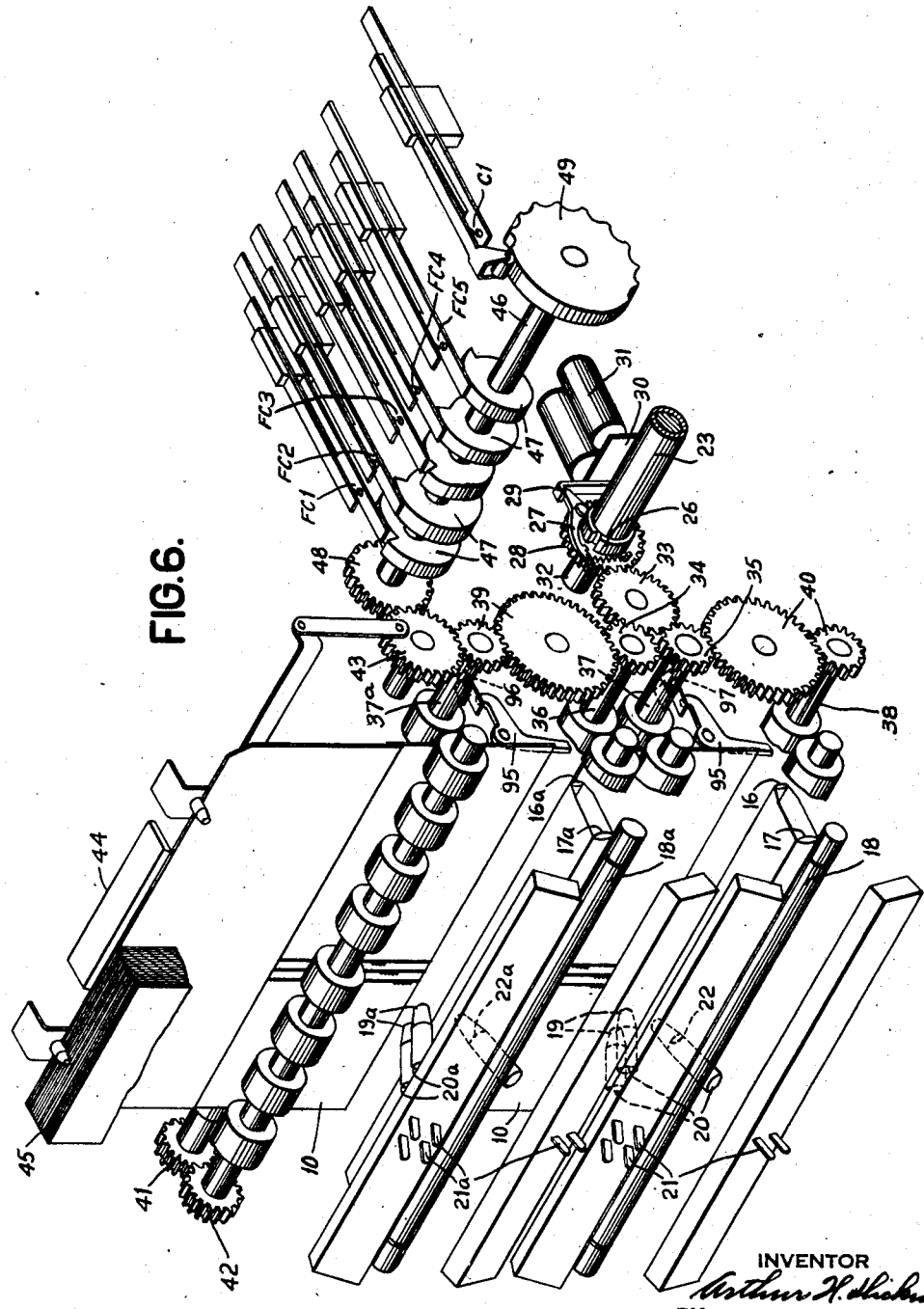
Fig. 6 is an isometric view of the record feeding and analyzing means.

Referring now to Figs. 4, 5 and 6 the method of and means for analyzing or sensing the light controlling index marks disposed on the records will be described. In Fig. 6 two data sensing stations are provided, the arrangement of the elements at both stations is precisely the same so that the description of one station is deemed sufficient. The purpose of the provision of the double station arrangement is the same as that in the present Hollerith statistical system wherein the upper sensing station is used for sensing the class and supplemental control data, and the lower sensing station is used for sensing the amount data.

A lens system is provided comprising two cylindrical lenses 16 and 17 to cause a narrow beam or line of light to be projected across the length of the record card 10 from the tubular light source 18. For each column on the record card a lens system 19 and 20 is provided to focus the light reflected from the card upon an individual light sensitive device 21, such as a photocell. Interposed between the individual lenses 19 and 20 a slotted disk 22 is provided to limit the amount of light reflected and projected from the card to the photocell so that the light from the corresponding column of the card is the only light the corresponding and associated photocell is subjected to. It is understood now, that, if a record card provided with differently shaped patterns at different index mark positions is fed past the sensing station described, the amount of light reflected and transmitted to any one photocell will pulsate or vary exactly in accordance with the pattern of light and dark portions of the index mark sensed. If the photocell is connected in a closed circuit, the varying amounts of light projected thereon will cause a corresponding pulsating current to flow therein, the frequency of which will correspond to the frequency of the variations in the light caused by the sensed index mark. It is obvious that the varying amounts of light are directed to the corresponding photocell only at the particular timed intervals the index marks are fed past the beam of light which is projected across the record card. The position where the said beam of light is projected upon the card will be referred to as the data sensing position. By reference to Fig. 6 it is seen that the lens system 19 and 20 and photocells 21 are disposed in a staggered arrangement, in this manner the spacing of the columns on the record cards can be less than if the lens system and photocells were all positioned adjacent to each other along a straight line.

The sensing elements provided at the upper sensing station are similar to those just described and the similar elements are provided with the same reference numerals, in addition thereto the numerals designating the elements at the upper station are provided with the suffix *a*.

Record card feeding means

Figure 7:
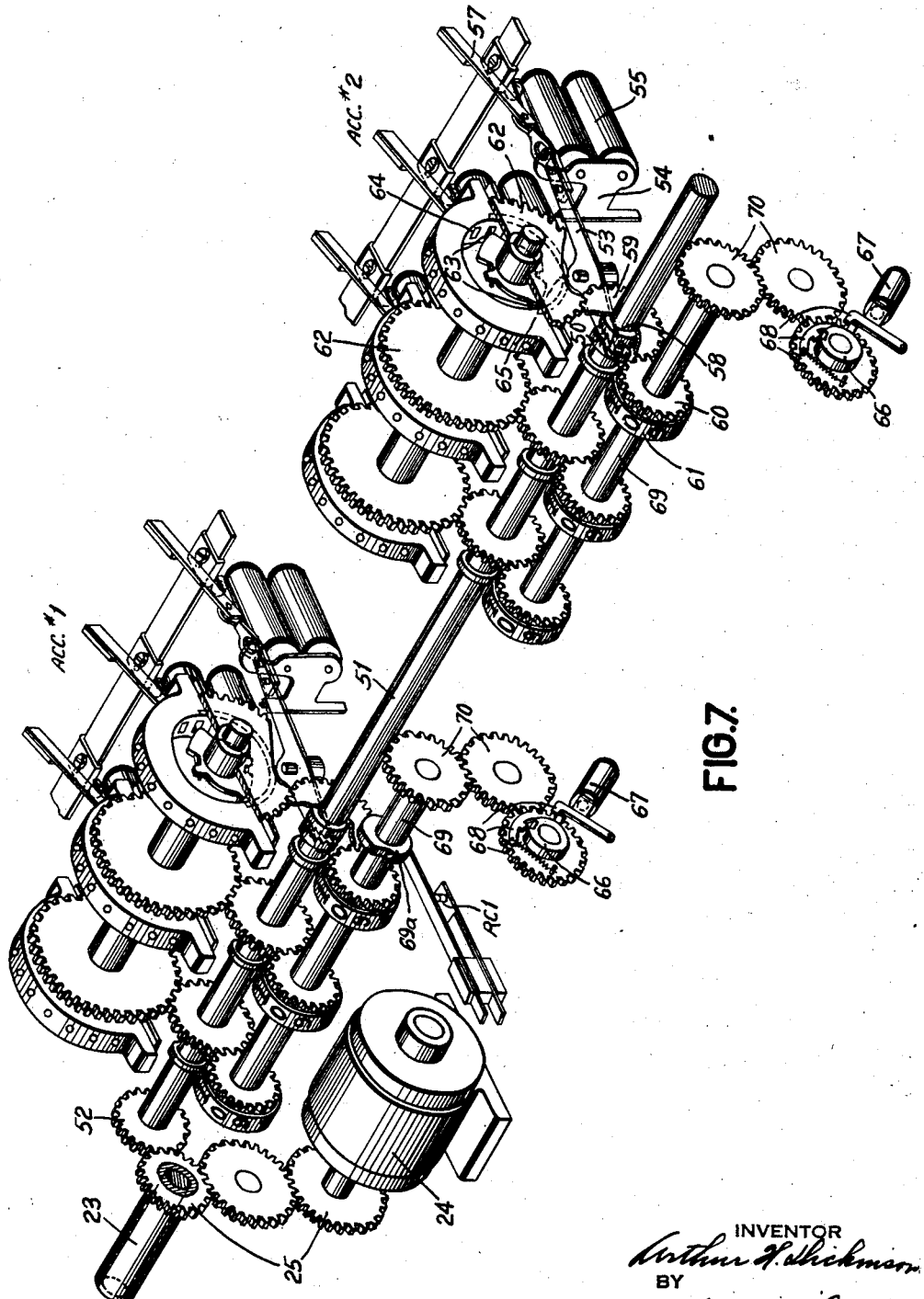
Fig. 7 is an isometric view of two sections of a data accumulating unit.

Referring now to Figs. 6 and 7 a brief description of the record card feeding means will be given. A hollow drive shaft 23 is provided to be continuously rotated by the motor 24 by means of the gear train generally indicated 25. Secured to the said shaft is a one tooth ratchet 26. A cooperating pawl 27 is pivotally mounted on the gear 28 and normally held out of engagement with ratchet 26 by the latch member 29 secured to armature 30 of the control magnet 31. Upon energization of magnet 31 the described clutch mechanism is released to drive the gear 28 which is secured to the shaft 32 (shaft 32 is journaled in the hollow shaft 23). By means of the idler gear 33 the gear 28 drives gears 34 and 35 which are secured to the feed roll shafts 36 and 37, respectively. The feed roll shafts 37a and 38 are driven by the gearings indicated by the reference characters 39 and 40 respectively. The cooperating pairs of feed rolls are connected together by means of gears indicated by the reference characters 41 and 42 which are suitably fastened to the corresponding feed roll shafts. The gearing 39 is also effective to drive gear 43 and the card picker mechanism 44, so that whenever the magnet 31 is energized the described mechanism feeds the record cards 10 singly from the stack 45 to the first pair of feed rolls, then past the upper sensing station, thence by means of the other pairs of feed rolls past the lower sensing station to a card stacker or hopper (not shown). The ratio of the described gearing is such that one record card is fed from the stacker each machine cycle. For a more detailed description of the card feeding mechanism which is well known in the art reference may be made to the U. S. Patent No. 1,976,617.

It should be mentioned that the shaft 46 to which a plurality of cams 47 are secured is continuously rotated by means of the gears 43 and 48 as long as the magnet 31 is energized. The individual cams 47 cooperate with the contacts FC1 to FC5 to control the closing of the contacts in accordance with timing shown in Fig. 9. A cam element 49 provided with a plurality of camming surfaces is also secured to shaft 46 for controlling the operations of the associated contacts C1 (see Fig. 9).

The usual card levers 95 are provided at the upper and lower sensing stations to close the associated contacts 96 and 97, respectively, as long as record cards are presented to the said stations for purposes which will be understood as the description progresses.

Data accumulating means

Referring now to Fig. 7, a plurality of clutch elements 50 are shown which are slidably mounted on the shaft 51 and keyed for rotation therewith. The said shaft is driven continuously by the gearing indicated by the reference characters 25 and 52. A clutch element is provided for each denominational order of the accumulator and is provided with a groove in which fits the end of an arm of a suitably pivoted lever 53. The said lever is normally held in the position shown by the armature 54 of magnet 55. Upon energization of the magnet its armature is attracted thereto thereby releasing the lever 53 which is urged by the leaf spring 57 and causing the clutch element 50 to move into engagement with the cooperating teeth 58 which are integral with gear 59, the latter being loosely mounted on shaft 51. Gear 59, when thus coupled to shaft 51 will rotate gear 60 which meshes therewith and displace the accumulator index wheel 61.

It is to be understood that the magnets 55 may be energized at different points in the machine cycle depending upon the disposition of the index marks sensed in the various columns on the records. This energization may take place in response to the detection of an index mark in any of the index mark positions represented by the accumulator index wheel. For example, sensing of an index mark in the "9" position will cause the clutch element 50 to be tripped to position the index wheel 61 nine steps before a declutching operation is effected by suitable control elements of the machine; and the sensing of an index mark in the "1" position will cause the clutch element to be tripped to position the index wheel one step before being declutched. The sensing operations for controlling the said control magnets will be described hereinbelow.

It should be stated that also driven by gear 59 is a gear 62 which is displaced in the same manner as the index wheel. Carried by and insulated from gear 62 is a pair of electrically connected brushes 63 one of which cooperates successively with a plurality of conducting segments 64 while the other cooperates with an arcuate conducting strip 65. The relationship of the parts is such that when the index wheel 61 is in its zero position, one of the brushes 63 is in contact with the zero segment 64 and the other brush is in contact with the strip 65, thus forming an electrical connection between the two. If the index wheel is displaced to indicate say "9," then one of the brushes will be in contact with the "9" segment and the other brush will be in contact with the conducting strip. The positioning of the brushes provides a convenient electrical readout mechanism for controlling total printing operations and the electrical circuits involved in these operations will be more fully explained in connection with the circuit diagram.

Two individual accumulators are shown in Fig. 7 and include three denominational orders for each accumulator. The number of individual orders provided can be increased or decreased as desired. For further detailed description of the accumulating mechanism, reference should be made to the Lake U. S. Patent No. 1,976,617 wherein such well known operations as, denominational order transfer, restoration of the clutch elements and magnet armatures to normal position, and resetting of the accumulator, are specifically described.

For illustrative purposes, assume that the motor shaft is extended to the right as viewed in Fig. 7 and has secured thereto the individual one tooth ratchets 66. The reset magnets 67 control the related single revolution clutch mechanism indicated generally by the reference character 68 and similar to clutch described in connection with Fig. 6 which cooperate with the corresponding ratchets to effect rotation of the reset shafts 69 by the gearing 70 thereby resetting the index wheels 61 to the normal zero position. Secured to and rotated by the reset shaft 69 associated with accumulator #1 is a cam element 69a for controlling the operation of the associated contacts RC1, the purpose of which will be described hereinbelow.

Data printing means

The printing or listing unit comprises in part a printing cam 71 secured to the sleeve 72 which is loosely mounted on the continuously rotating shaft 51. The member 73 cooperates with and is actuated by a cam groove 74 formed in the printing cam so that the bail 75 is effective to impart an upward movement to the typebars 76 by means of the resilient connection therebetween, such as springs 77. The typebars are provided with a plurality of ratchet teeth 78 which cooperate with the stopping pawls 79 so that the typebars may be interrupted at different positions to present any of their type elements 80 to the printing platen 81 for cooperation therewith.

By virtue of the said spring connections the typebars may be interrupted without interfering with the upward movement of the bail 75 which has an invariable extent of movement controlled by the printing cam. Energization of any one of the magnets 82 causes the spring pressed pivoted latch 83 to be rocked to release the related pawl 79 so that the pawl may swing into engagement with teeth 78 and interrupt the further upward movement of the corresponding typebar. Associated with each typebar is a printing hammer 84 which is effective to strike the type elements 80 when they are positioned in the selected printing positions thereby effecting printing therefrom. The printing hammers are actuated upon positioning of the member 73 to the upper extremity of its movement. The detailed operation of this printing mechanism is well known, and reference may be made to the aforementioned Lake patent for further details.

In order to control the times when the printing unit is operated, a control magnet 85 is provided for controlling the operation of a single revolution clutch 86 of the type described hereinabove. A single tooth ratchet 87 is secured to shaft 51 which cooperates with the released clutch mechanism which is fixed to the sleeve 72. Fixed to the sleeve 72 and rotated thereby are cams 88 for the purpose of controlling the operations of the related contacts LC1 and LC2; and also carried by and insulated from the sleeve 72 is a pair of brushes 89, one of which cooperates successively with the conducting segments 90 while the other wipes over a common arcuate conducting strip 91. The timing is such that a brush successively contacts each of the segments as a corresponding type element approaches the printing position. These contact devices are well known for controlling the total printing circuits and are generally referred to as impulse emitters.

Operation of the machine

Referring now to Figs. 9, 10a and 10b the operation of the machine will be described. Assume that the main switches S1 are closed to energize the motor 24 and light sources 18 and 18a and that the cards are properly placed in the supply stack 45, when the start key SK1 is depressed to close the contacts 100 to complete a circuit from conductor 101 through the coils of magnet 31 and relay R5, contacts 100 to conductor 102, energizing the said magnet and relay. Energization of the control magnet 31 causes the card feeding mechanism shown in Fig. 6 to operate and during the first machine cycle a card is advanced towards the upper sensing station to close the contacts 96. Closure of the last mentioned contacts completes a circuit from the power supply conductors to the coil of relay R1 to energize said relay as long as cards are presented to the upper sensing station. Sensing of the index marks on the cards at the said station occurs during the following machine cycle which at the moment is the second cycle. If the start key is held depressed, the machine is operated through a second cycle during which the first card is fed past the upper sensing station and advanced to the lower sensing station sufficiently to close the contacts 97. Closure of these contacts cause relay R2 to be energized and establish a holding circuit for the magnet 31 and relay R5 as long as cards are presented to lower sensing station which is as follows: from conductor 101 to coils of magnet 31 and relay R5, contacts R2a, R5a and 103 of the stop key SK2 to conductor 102.

Assume that the switch S2 is in the list position shown in Fig. 10a, it is seen that magnet 85 is also energized as long as cards are fed to the lower sensing station by means of the circuit from conductor 101 through the coil of magnet 85, contacts R2b, switch S2, contacts R4c, R2a, R5a and 103 to conductor 102. Energization of the said magnet causes the printing means shown in Fig. 8 to be operated as described hereinabove.

The machine is now conditioned for continuous operations, and for the present description assume that it is desired to accumulate and list the data appearing in the same three columns on the cards; also assume that on some of the cards presented to the sensing stations the data in the said columns are represented by index marks which are so shaped as to represent frequencies f1, f2 and f3, and on other cards the data are represented by index marks of frequencies f4, f5 and f6. In accordance with the present illustration, the data recorded in frequencies f1 to f3 is entered into accumulator #1 and the data recorded in frequencies f4 to f6 is entered into accumulator #2. It will also be seen that the data represented by each frequency is always entered into the same denominational order of the accumulators even though the control impulses of different frequencies are all impressed upon the same transmission channel interconnecting the sensing units and data manifesting units.

In view of the description hereinabove, it is understood now that as the differently shaped index marks are fed past the sensing position the related photocells 21 are subjected to light variations in accordance with the patterns of the index marks at the differential times the said index marks appear at the sensing position. Now, whenever the photocells 21, which are connected in a parallel circuit arrangement to the input of the amplifier unit generally designated 104, are subjected to such light variations, the said cells are effective to control the conductivity of the amplifier so that electrical oscillations of frequencies corresponding to the frequencies of the light variations impressed upon the cells are caused to flow in the output circuit of the amplifier which includes the primary winding of the transformer 105. To each of the secondary windings of the said transformer suitable filter, rectifying and amplifying units are connected which are represented generally by the reference characters 106, 107 and 108 respectively. Each of the filters 106 are so adjusted that only one frequency of the multi-frequency oscillations is passed by each filter which in turn is impressed upon the connected rectifying and amplifying units to effect energization of the corresponding relay of the group R10 to R15. Now, in accordance with the chosen illustration, whenever electrical oscillations of the order of frequency f1 are initiated and impressed upon the transformer 105, relay R10 and only this relay is energized, relay R11 is energized by the initiated oscillations of the order of frequency f2, etc.

Upon energization of any of the relays of the group R10 to R15 the related contacts R10a to R15a are closed to effect energization of the accumulator and listing control magnets thereby effecting accumulating and listing of the data sensed; one such circuit, for example, is as follows: conductor 101, contacts C1, R10a, R3b, R6c, magnet 55 and conductor 102 and also from contacts R3b by means of conductor 110 to magnet 82 and conductor 102. Now upon energization of the described circuit or any of the similar circuits the related accumulator control magnet is effective to cause the associated index wheel 61 and brushes 63 to be displaced thus causing manifestation of the data sensed upon the record card, and by energization of the listing control magnet 82 registration or listing of the sensed data is effected. It is seen that the electrical impulses initiated by each index mark, irrespective of its columnar position are always directed to the control magnets of the proper and corresponding order of the accumulator and listing units by means of the circuits just described. For the oscillations of the order of frequencies f1 to f3, relays R10 to R12 are controlled upon initiation of such oscillations to control in turn the operation of the data entry means of accumulator #1 and the corresponding orders of the listing means, for oscillations of frequencies f4 to f6 the data entry means of accumulator #2 and the corresponding orders of the listing means are controlled thereby. It is obvious that individual and separate accumulating and listing operations can be effected whenever desired by disconnecting the related control magnets from the described circuits.

Now, it will be described how supplemental index marks at the "11" or "12" index mark position may be utilized for controlling the operations of the described statistical machine. Assume that the said supplemental index marks are formed at the "11" index mark position in one of the columns as shown in Fig. 1 and that the configuration of these index marks are such as to generate electrical oscillations of frequency f1 whenever these marks are sensed. It should be understood, if desired, other marks than frequency indicating marks can be employed for the mentioned supplemental index marks, so long as the proper sensing and associated control circuits are employed therewith. In order for the supplemental index marks to exercise the desired controlling operations these marks are sensed at the upper sensing station so that the light variations caused by the said marks are directed to the photocell 21a. The said photocell is shown connected in the input circuit of the amplifier unit 111 for controlling the latter so that oscillations of frequency f1 are impressed upon the connected rectifying unit 112 and amplifier tube 113 whenever the supplemental index marks are sensed thereby effecting energization of the relay R9 which is included in the output circuit of the tube 113. Upon energization of the said relay contacts R9a are closed at the "11" point in the machine cycle causing a circuit to be established from conductor 101 to coil of relay R4, contacts R1a, R9a and FC3 (which are closed at the "11" point) to conductor 102, energizing the said relay. A holding circuit for this relay is then completed from conductor 101 to coil of relay R4, contacts R4a and FC4 to conductor 102. In the following cycle, relay R3 is picked up upon closure of the FC1 contacts and maintained energized by the holding circuit from conductor 101, to coil of relay R3, contacts R3a and FC2 to conductor 102. The said holding circuit is maintained throughout the entire sensing portion of the machine cycle. It is understood now that the amount data on the card provided with the sensed supplemental index mark is sensed during the time of the cycle that relay R3 is energized, or stated in other words, the amount data on the said card is sensed during the cycle following the sensing of the supplemental index mark on the same card.

Contacts FC5 are provided to insure that, upon depression of the stop key SK2, the card feed clutch and print control clutch are latched up at the "D" position during the same cycle.

Energization of relay R3 causes the associated contacts R3b to R3g to be opened during the entire sensing portion of the machine cycle, so that it is seen wherever a supplemental index mark is sensed at the upper sensing station, the control circuits to the control magnets of the accumulating and listing units are opened at the times the amount data on the corresponding card is sensed at the lower sensing station thereby preventing accumulating and listing of the amount data sensed during the particular machine cycle. As long as the supplemental index marks are sensed at the "11" index mark positions on the record cards the accumulating and listing of the corresponding amount data on these record cards are suppressed. Whenever suppression of the amount data is effected as described the clutch control magnet 85 of the printing unit is deenergized by means of the opened contacts R4c, thus preventing any supplemental operations of the printing unit at such times when listing of the amount data is undesired. From the specific description just set forth, it will be obvious to those skilled in the art how the supplemental index marks may be employed for other control operations of the described statistical machine.

Whenever it is desired to effect a total taking operation the card feeding means must be interrupted either by depressing the stop key SK2 to open contacts 103 or by feeding the last card of the stack to the sensing stations causing contacts 97 to be opened and deenergize relay R2. It is remembered that contacts R2a and 103 are included in the holding circuit for magnet 31 and relay R5 and opening of either set of contacts effects deenergization of the said magnet and relay. Now, the total key TK is depressed, and held depressed until the end of the total taking operations, for establishing a circuit from conductor 101 to coil of relay R6, contacts R7b and 115 to conductor 102, energizing said relay. Closure of contacts R6a establishes a circuit through the printing unit control magnet 85 causing the printing means to be set in operation. Closure of contacts R6i connects the conductor 101 to the common conducting ring of the emitter device to establish different circuits at differently timed intervals as the brush 89 of the emitter engages the conducting segments 90 successively thus causing the printing control magnets 82 to be energized at differential times in accordance with the setting of the brushes 63 of the accumulator readout means thereby effecting printing of the total data setup in the accumulating means. Opening of contacts R6c to R6h prevents back circuits from being established to the control magnets of the accumulating means. Near the end of the listing cycle contacts LC2 close to energize the magnets 67 of the accumulators thereby effecting resetting of the index wheels thereof to a zero position during the following cycle. After the closure of the LC2 contacts in the listing cycle contacts LC1 close to energize relay R7 and effect deenergization of the relay R6 due to opening of contacts R7b thereby insuring that the printing means is operated only one cycle during total taking operations in the event the total key is held depressed too long. Resetting of the accumulating means can be effected without first initiating a total taking cycle, for this reason, the reset key RK is provided, and it is evident that upon depression of this key that the magnets 67 are energized to initiate a resetting cycle. To insure that the resetting operation does not extend beyond one cycle of operation contacts RC1 and relay R8 are provided for control purposes similar to those described for contacts LC1 and relay R7.

A machine having features common to those shown and described herein is shown and claimed in the patent to A. H. Dickinson, No. 2,231,494, dated February 11, 1941.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claim.

What is claimed is:

A control element for controlling the operations of statistical machines comprising a record medium provided with data designations for representing multidenominational order amounts, which designations are differentially disposed thereon in different columnar areas so as to represent by their positioning in the said areas the digital values of the amount digits, and wherein the said designations comprise index marks having linearly arranged light modifying portions for representing predetermined frequency values in order to designate the denominational order values of the amount digits, which linearly arranged portions extend longitudinally of the columns, and the frequency value of each index mark in a columnar area being different with respect to the frequency values of the other marks in the remaining columnar areas.

ARTHUR H. DICKINSON.